United States Patent

[11] 3,586,854

[72] Inventor Bogdan Zega
 Geneva, Switzerland
[21] Appl. No. 722,951
[22] Filed Apr. 22, 1968
[45] Patented June 22, 1971
[73] Assignee The Battelle Development Corporation
 Columbus, Ohio
[32] Priority Apr. 21, 1967
[33] Switzerland
[31] 5762/67

[54] METHOD OF MEASURING THE RATE OF
 EVAPORATION IN A VACUUM, A GAUGE FOR
 CARRYING THIS METHOD INTO EFFECT, AND
 AN APPLICATION OF THIS METHOD
 14 Claims, 10 Drawing Figs.
[52] U.S. Cl.................................................. 250/43.5,
 118/7, 118/49.1, 118/49.5, 250/49.5, 250/83.3
[51] Int. Cl....................................................... G01n 9/24,
 G01n 23/12
[50] Field of Search........................................... 250/49.5 D,
 49.5 H, 49.8, 43.5, 43.5 FC; 118/7, 49.1, 49.5;
 219/121 EB

[56] References Cited
UNITED STATES PATENTS
3,230,366 1/1966 Mielczarek et al. .......... 250/49.5(1)
3,373,278 3/1968 Cilyo............................ 250/49.5(0)
2,952,776 9/1960 Schumacher et al. ........ 250/71

Primary Examiner—James W. Lawrence
Assistant Examiner—A. L. Birch
Attorney—Gray, Mase & Dunson ABSTRACT: A method and apparatus for measuring the evaporation rate of substances which involves vaporizing the substance, generating a jet of the vapor in an evacuated enclosure, scanning through a cross section of the vapor jet with a beam of electrons, collecting the collision products generated during scanning, thereby giving rise to a current having a continuous component due to electrons colliding with the residual gas present in the enclosure and a periodic component due to electrons colliding with the vapor jet, and separating the continuous component from the periodic component, the amplitude of the latter being the measure of the numerical density of the vapor jet.

PATENTED JUN22 1971

METHOD OF MEASURING THE RATE OF EVAPORATION IN A VACUUM, A GAUGE FOR CARRYING THIS METHOD INTO EFFECT, AND AN APPLICATION OF THIS METHOD

This invention provides a method of, and a gauge for measuring, by means of an electronic beam, the rate of evaporation of substances, which are vaporized in the form of at least one vapor jet, in an evacuated enclosure.

Among the known methods for measuring the rate of evaporation, a distinction should be made between the indirect methods, which are based on a determination of the amount of condensed substance and which require, in order to provide a measure of the rate, a subsequent time derivation, and the direct methods which are based on the determination of a value inherently tied to the rate of evaporation. The indirect methods, such as by weighing with a microbalance the layer deposited on the substrate per se or on an auxiliary substrate, or by determining the variation in the inherent frequency of a quartz blade acting as an auxiliary substrate and which becomes progressively covered with a layer of the evaporated substance, have the disadvantage of necessitating periodic cleaning of the substrate used for measuring purposes, an operation which generally requires the vacuum to be broken or at least partially to dismantle the evaporation installation. The direct methods are based on the fact that, in the majority of cases, the rate of evaporation is tied to the numerical density of the atoms or molecules constituting the vapor jet which is set up between the crucible holding the substance being volatilized and the substrate. That is why all direct methods for measuring the rate of evaporation are based on a measurement of this density. To achieve this, in known methods, a proportion of the atoms are ionized by means of an ionizing agent, mostly an electron beam, and the ionic current that is set up when these ions are subjected to an electric field is then measured. This procedure encounters however a major difficulty which is due to the fact that the electrons not only ionize the atoms of the substance, but also ionize those of the residual gas which lie in the path of the ionizing beam. In fact, these methods amount to the use of an ionization gauge so that the total indication of the latter must be divided into two parts: one relating to the vaporized substance as such and the other relating to the residual gas. It is only in those rate instances when the vacuum in the enclosure is very high that the ionization due to the residual gas is negligible and that the total indication becomes acceptable. But in practice, there is always a disturbing effect due to the residual gas. Among the known methods which eliminate this disturbing effect, there are those which resort to two ionization gauges, one through which passes the vapor jet and which measures total ionization, and the other which is placed away from the jet and which measures the ionization of the residual gas alone. These two gauges each give rise to an ionic current and the difference between these two currents is then worked out, which difference only depends on the ions of the volatized substances and thus constitutes a measure of the rate of evaporation. This procedure supposes however that the emissions of the cathode are strictly identical in both gauges, in particular that their temperatures are the same, a condition which necessitates taking careful precautions for stabilizing the heating. To safeguard against emission fluctuations on the part of the cathodes, use is sometimes made of a double gauge having a common cathode: ionization fluctuations due to temperature fluctuations are then automatically eliminated when working out the difference between the ionic currents. However, both in the case of a pair of separate gauges and in the case of a double gauge, the ionic currents are continuous; the same applies to their difference, so that these methods both suffer from the drawbacks that are inherent to the amplification of very small continuous currents.

Another method which does not entail these drawbacks consists in modulating the jet of vapor which passes through the ionization gauge, for instance by placing in its path a shutter device. The ionic current delivered by the gauge is then made up of a continuous component, derived from the residual gas, and of a periodic component which is derived from the vaporized substance, this periodic component having a frequency equal to that of the jet interruptions. This periodic current thus measures the rate of evaporation; it can readily be separated from the continuous component and the amplification thereof is much easier than that of a continuous current. But this method requires placing within the evacuated enclosure a moving mechanical or electromechanical member, a requirement which is not free of drawbacks. Moreover, this member is sensitive to the ions generated by the vapor source itself (in particular when heating is achieved by electronic bombardment) and in frequency of the periodic component is low, thereby complicating the subsequent amplification of this component.

The invention eliminates these drawbacks by proposing a method wherein the jet of vapor is periodically subjected to the influence of the electronic beam, while the residual gas is permanently subjected to it. This method comprises generating within said enclosure a sharp electronic beam whose electrons are capable of colliding with the atoms or molecules it encounters, moving the electronic beam in said enclosure to cause it to scan a surface so positioned that said jet of vapor may pass therethrough, collecting the collision products generated during scanning, thereby giving rise to a current having a continuous component, due to the collisions with the particles of the residual gas present in said enclosure, and a periodic component, due to the collisions with the particles of the jet of vapor separating said continuous component, from said periodic component, and measuring the amplitude of the latter, which amplitude represents the numerical density of the vapor jet particles.

The gauge provided by the invention comprises an electron source, an electron collector located, in relation to the vapor jet, on the side opposite the electron source, a collision products collector and at least one measuring instrument located outside the enclosure and intended to measure at least part of the current circulating in the collision products collector, wherein said electron source consists of an electron gun which is capable of generating a sharp electronic beam and which is associated with a deflecting device located at the outlet of said electron gun and capable, under the action of a scanning generator outside said enclosure, of moving the sharp electronic beam along a scanning surface having as its axis of symmetry the axis of the electron gun, said collision products collector being placed away from said surface, and wherein the collision products collector is connected to the input of a detection circuit located outside said enclosure and capable of eliminating the continuous component of the current circulating in said collector under the effect of the collected collision products and of only allowing the periodic component of this current to appear at its output, said measuring instrument being connected to this output.

The invention finally provides an application of this method, which application is characterized in that the signal formed by the amplitude of said periodic component is used to control a regulator capable of adjusting the heating of the evaporation crucible from which issues the vapor jet, whereby the rate of evaporation may be tied to a given set value.

In the accompanying drawings:

FIG. 1a shows a modified form of this first embodiment;

Figure 1:
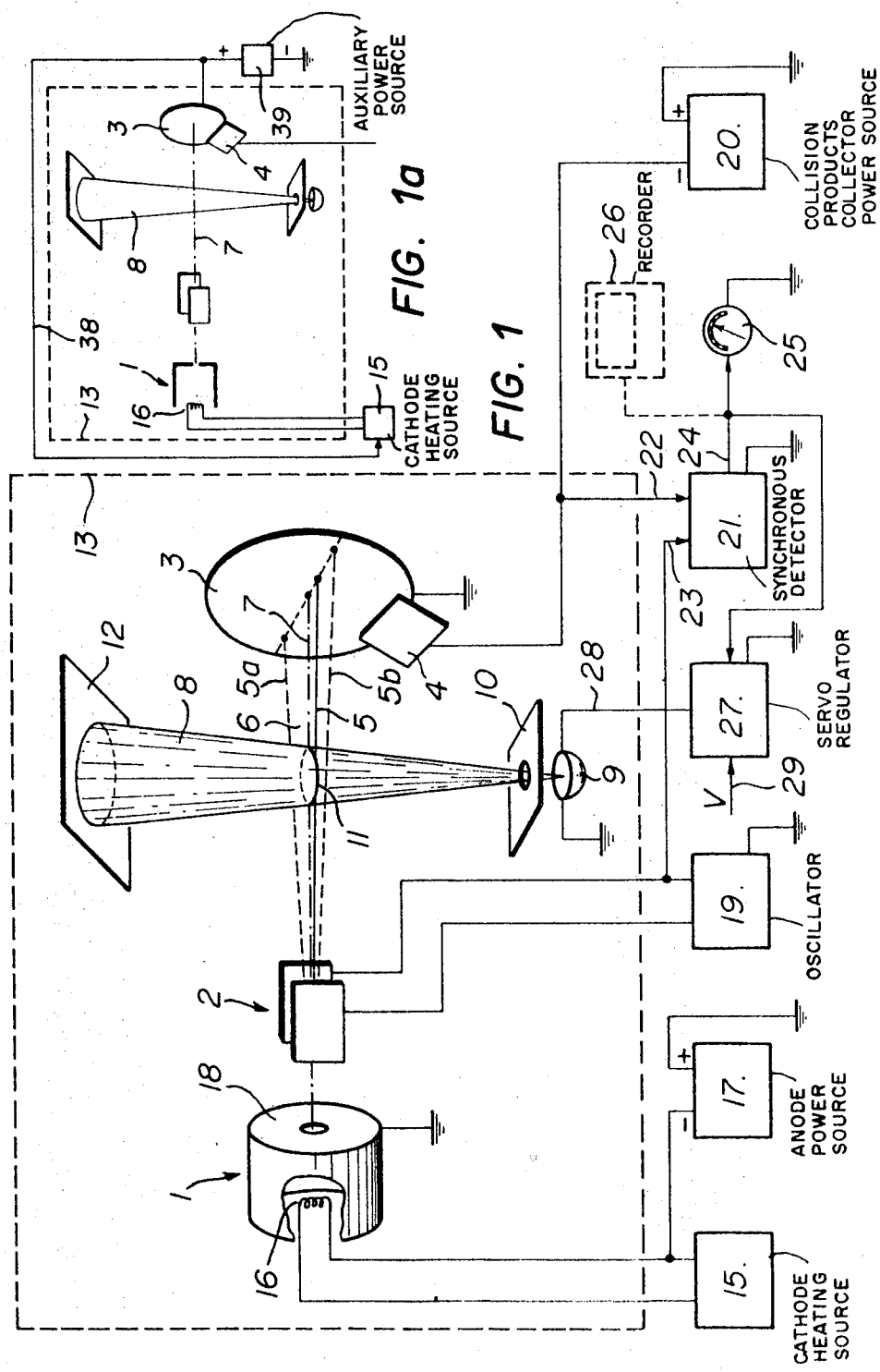
FIG. 1 is a diagrammatic view of a first embodiment of the gauge.

The gauge illustrated in FIG. 1 comprises an electron gun 1, a deflector device 2, an electron collector 3 and a collision products collector 4. The sharp electronic beam 5 emitted by the electron gun scans, under the action of the deflector 2, the portion 6 of the plane passing through the axis 7 of the gun 1 and alternately passes from one extreme position 5a to another 5b, these extreme positions being substantially symmetrical in relation to the axis 7. The portion 6 of the scanning plane is so placed that a jet of vapor 8, which issues from a crucible 9 and which is delimited by a diaphragm 10, will pass through this portion 6 in a region 11 lying between the extreme positions 5a and 5b of the electronic beam. The gun 1, the deflector 2, the collectors 3 and 4, together with the crucible 9 and the substrate 12 on which jet 8 condenses, are inside a vacuum enclosure diagrammatically represented by a broken line contour 13. It is of advantage to provide the electron collector 3 with a relatively pronounced concave shape and to place the collision products collector 4 beneath the electron collector 3 and to the front thereof: this reduces the disturbing influence of the secondary electrons generated by the beam 5 upon impact thereof on the electron collector 3. On the outside of the enclosure are the electrical components, in particular a source 15 for heating the cathode 16 of gun 1, a source 17 delivering the anode voltage to the anode 18 of gun 1, an oscillator 19 supplying the two plates of the deflector device 2, and a source 20 which produces the potential that is applied to the collision products collector 4. These electrical components are connected to the respective elements of the gauge by feed-throughs of the usual type not shown. The collector 4 is moreover connected to the main input 22 of a synchronous detector 21 which receives through an auxiliary input 23 the periodic scanning voltage generated by the oscillator 19.

This synchronous detector is a known form of apparatus capable of eliminating the continuous component of the current it receives at its main input and of only allowing the periodic component, after duly amplifying and filtering it, to issue from its outlet, the frequency of this periodic component being tied to that of the signal it receives through its auxiliary input. It has a high signal to noise ratio which renders it particularly suitable for detecting a weak signal. A current measuring instrument 25 is connected to the output 24 of the synchronous detector 21. The anode 18 of the electron gun 1 and the electron collector 3 are both grounded and are thus at the same potential.

Figures 2, 3:
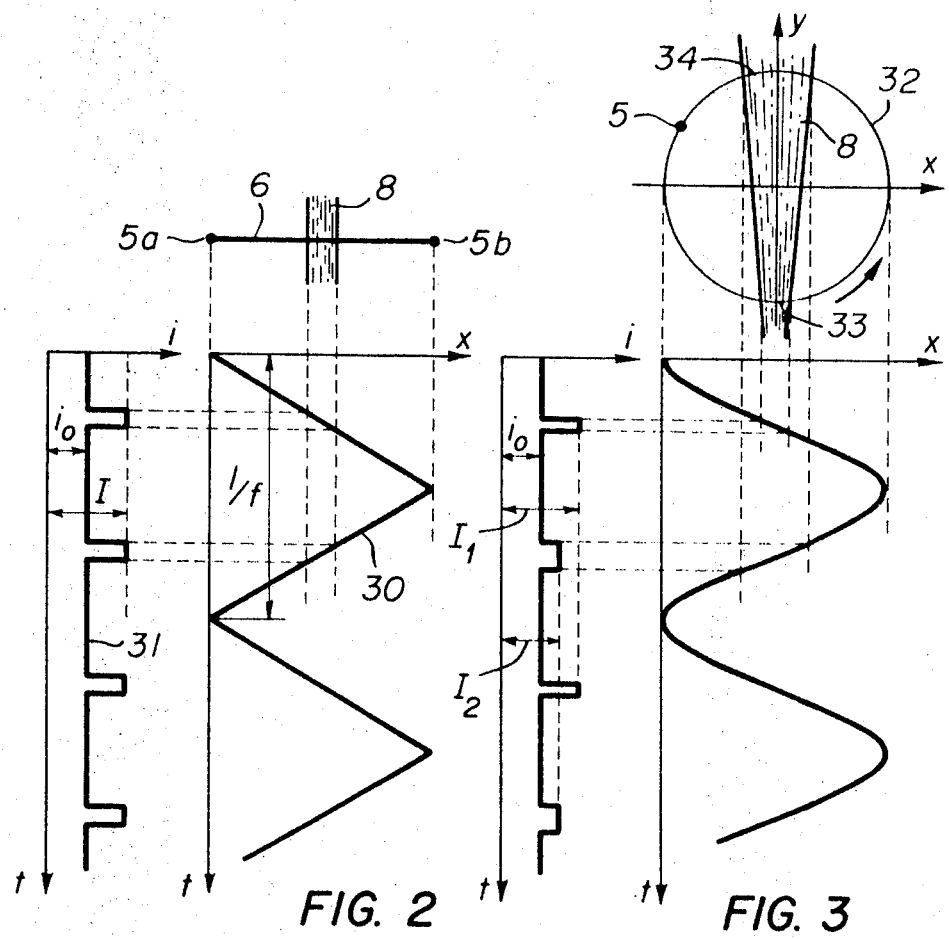
FIG. 2 shows a diagram and two graphs illustrating the operation of the first embodiment.
FIG. 3 shows a diagram and two graphs illustrating the operation of a second embodiment of the gauge.

The operation of this gauge is as follows:

As long as the electron beam 5 lies outside the vapor jet 8, it produces, through collision with the residual gas, collision products which are picked up by the collector 4 and which give rise to a current having a constant value $i_o$. As soon as the electron beam encounters the vapor jet 8, it gives rise to a far larger quantity of collision products so that the current of collector 4 increase and reaches a value I, then to drop back again to value $i_o$ as soon as the beam has moved past jet 8. The same phenomenon recurs during the return scanning movement from position 5b to position 5a. This is what is illustrated in FIG. 2 which shows diagrammatically, viewed from the electron gun 1, a cross section of the scanning plane 6 through a plane passing through the jet 8 and at right angles to the axis 7 of gun 1, as well as a graph 30 showing the position x of the electronic beam in relation to time t and a graph 31 of the current i in relation to time t. It will clearly be observed how at each crossing of the jet 8 the electronic beam gives rise to impulses I superposed on the background current $i_o$. To make the drawing clearer, these impulses have been shown in the form of rectangular impulses, although in fact they do not have steep wavefronts. This FIG. shows that the frequency of the impulses I is double that of the scanning frequency, which explains why it is of advantage to resort to a synchronous detector, such as detector 21, in order to eliminate the continuous component $i_o$ of the ionic current in the collision products collector 4. In addition to the direct reading (micro or milliamperes) measuring instrument 25, it may be useful to record the current issuing from the detector 21 by means of a recorder 26, which, because of its optional nature, is shown in broken lines.

FIG. 1 is concerned with the case where use is made of the inelastic collisions of the electrons of beam 5 and where as a result, the collision products are ions. This is why source 20 is so connected that the collector 4, which must then collect ions, can be given a negative potential in relation to the electron collector 3.

But use can also be made of the elastic collisions of the electrons of beam 5. The collision products then consist of electrons from the beam 5 which have been scattered. In this case, the collector 4 is a scattered electrons collector and it must have imparted thereto a positive potential in relation to the collector 3, this being achieved by connecting source 20 in reverse manner, with its negative terminal grounded. FIG. 1 refers moreover to an example wherein the measure of the evaporation rate, formed by the periodic component of the current from collector 4, is used to control evaporation by tying the heating of crucible 9 to the value of this component. That is why the output 24 of the synchronous detector 21 is also connected to a servo regulator 27 mounted in the heating circuit 28 of the crucible. In this way, the rate of evaporation can be kept highly constant and this rate can be given a freely selected value V, this value V being set on the servo regulator 27, this being indicated by the arrow 29.

It will be observed that this gauge does not include any moving mechanical components; it is very simple and the electrical components associated therewith are all well known. Despite this simplicity, it enables accurate measurement of the rate of evaporation and enables the latter to be tied to a well defined set value which can be freely chosen. It delivers a high frequency signal, it is insensitive to ions generated within the crucible, it does not become soiled, and finally the measurement is only confined to a well defined section of the jet and as a result is concerned with a localized volume.

FIG. 1 illustrates an embodiment wherein the scanning action is of the electrostatic type. Clearly, the rectilinear scanning action can be achieved in other ways, for instance magnetically. Further, the scanning action need not necessarily be such as to produce a symmetrical saw-toothed configuration, although such is the case with the diagram of FIG. 2. The scanning action may be sinusoidal, thereby simplifying the construction of the oscillator 19. It can also have an asymmetrical saw-toothed configuration with a quick return movement. The only condition to be respected is that its frequency $f$ be such that the time period separating two consecutive crossings of the vapor jet by the electronic beam be sufficiently long for the batch of collision products generated during the first crossing to reach the collector 4 before the arrival of the batch generated during the next crossing. In other words, the impulse I must be distinguishable.

Instead of a scanning action along a plane (rectilinear scanning, if observed from gun 1), there may be provided a scanning action along a cone (circular scanning, viewed from gun 1). In this case, as is apparent from FIG. 3, which shows, viewed from gun 1, a cross section of the scanning cone through a plane at right angles to the axis 7 of this gun and passing through the jet 8, the beam describes a circle 32 which meets the jet 8 at two locations 33 and 34 placed at different distances from the crucible 9. This gives rise to two impulses per revolution, of which the first $I_1$, corresponding to the encounter at location 33, near the crucible, is relatively high and narrow, and of which the second $I_2$, corresponding to the encounter at location 34, further away from the crucible, is relatively low and wide. This difference is due to the fact that the vapor jet progressively broadens as it moves away from the crucible, whereas the flow rate of vapor remains the same at a cross section point of the jet.

Figure 4:
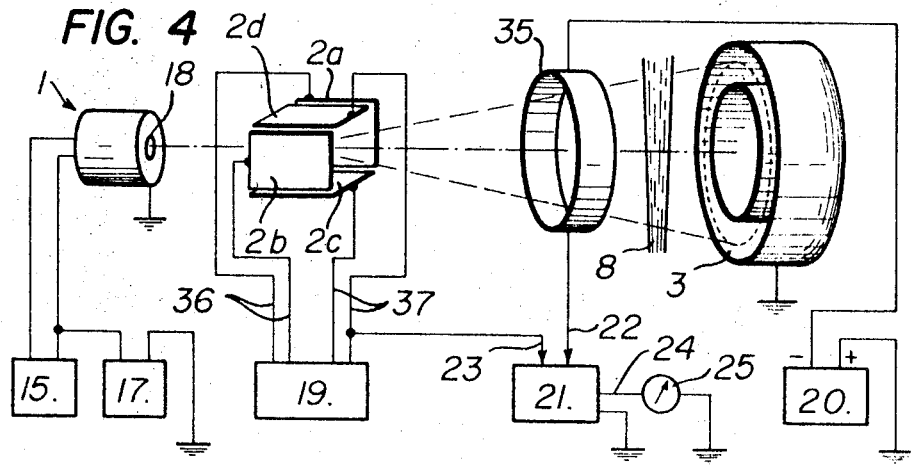
FIG. 4 is a diagrammatic view of this second embodiment.

In the case of the circular scanning action, it is of advantage to provide the collision products collector 4 with a circular cross-sectional shape, e.g. a cylindrical ring 35 as is apparent from FIG. 4, or frustoconical, and to center it on the axis 7, so that it may surround the scanned conical surface; its radius must be such that its distance from this surface enables the impulses $I_1$ and $I_2$ to be distinguishable.

The deflecting device 2 then comprises two deflectors oriented at right angles. These deflectors may both be of the electrostatic type, as is apparent from FIG. 4, or both of the magnetic type, or possibly a mixed system wherein one of the deflectors is electrostatic and the other magnetic. These two deflectors are each connected to one of the outputs comprised by the oscillator 19, which is required to supply two sinusoidal voltages in quadrature. Thus the pair of plates 2a, 2b of the horizontal deflector is connected to the output 36 and the pair of plates 2c, 2d of the vertical deflector is connected to the output 37, the latter being moreover connected to the auxiliary input 23 of the synchronous detector 21.

The remainder of the gauge is unchanged and its operation is the same as that described in relation to FIG. 1.

Whatever type of scanning action is adopted, it is advisable, in order to increase the sensitivity of the gauge, to stabilize the intensity of the electronic beam current. To achieve this, as shown in FIG. 1a, the electron collector 3 is connected to the heating source 15 for cathode 16 by a feedback line 38; this collector is no longer grounded but is connected to an auxiliary source 39 which imparts thereto a positive potential in relation to ground.

Figure 5:
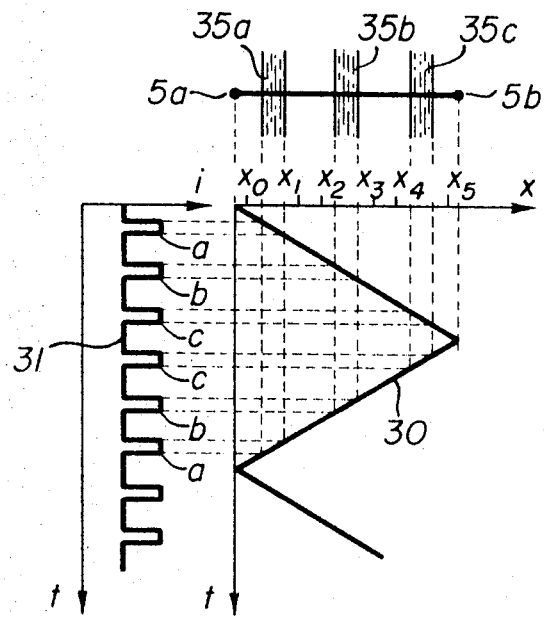
FIG. 5 shows a diagram and two graphs illustrating the operation of the first embodiment in a particular case of use.
Figure 6:
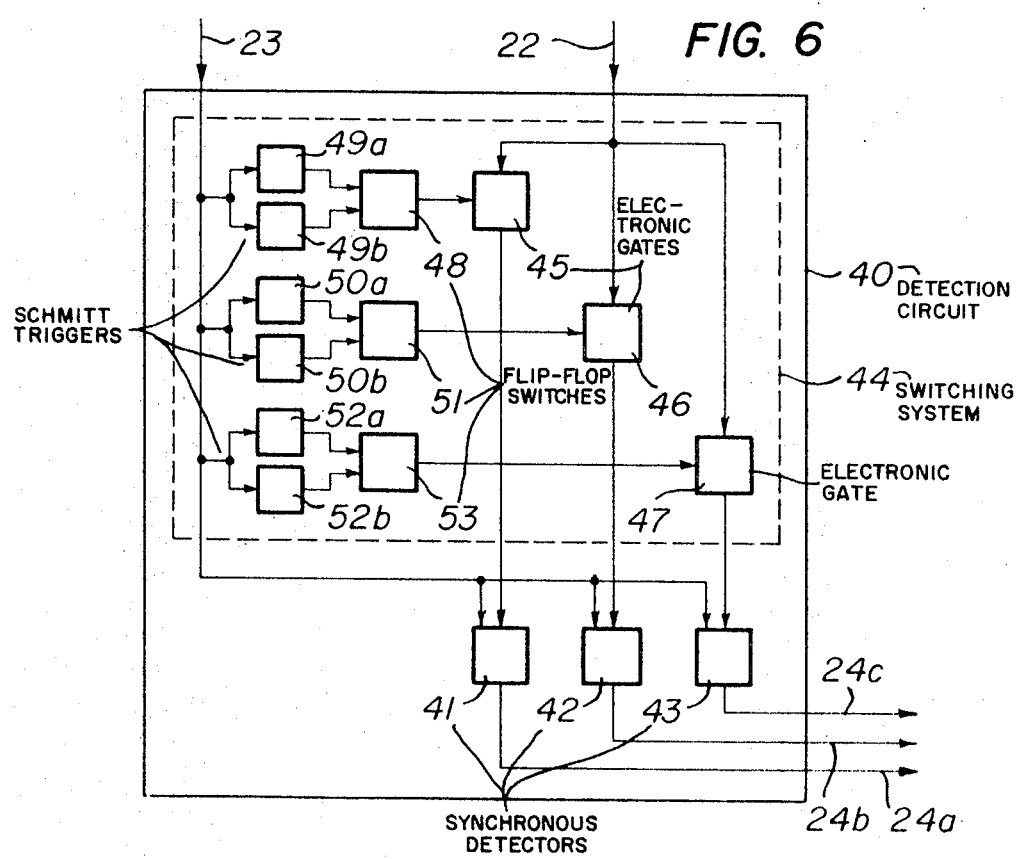
FIG. 6 is a functional diagram relating to a part of the electronic circuit of FIG. 1 in this particular case of use.

The rectilinear scanning gauge shown in FIG. 1 lends itself to measuring several vapor jets. This is what is shown in FIG. 5 which is the equivalent of FIG. 2 in a case where there are three distinct vapor jets, i.e. jets 35a, 35b and 35c. In the course of its scanning action, the electronic beam successively encounters these jets, thereby each time giving rise to an impulse of the current in collector 4; thus impulse a corresponds to the encounter with jet 35a, impulse b corresponds to the encounter with jet 35b, etc. These impulses follow one another, in the course of a scanning cycle, in the order a b c c b a and instead of the single synchronous detector 21 (FIG. 1), it becomes necessary to provide (FIG. 6) a detection circuit 40 comprising three synchronous detectors 41, 42 and 43, preceded by a switching system 44 adapted to sort out the impulses and to dispatch them on to the appropriate synchronous detector. The switching system consists of three electronic gates 45, 46 and 47 each controlled by a flip-flop, which is in turn triggered by a pair of triggering circuits, e.g. Schmitt triggers having stepped triggering thresholds. Thus, gate 45 is controlled by the flip-flop 48 which is itself triggered by the pair of Schmitt triggers 49a and 49b. These Schmitt triggers receive, via line 23, the scanning voltage and the first of these triggers, 49a, is adjusted to react when the scanning voltage reaches a value corresponding to a position $x_o$ of the beam located to the left of jet 35a (FIG. 5), whereas the second of these triggers, 49b, is adjusted to react when the scanning voltage reaches a value corresponding to a position $x_1$ of the beam to the right of jet 35a, but to the left of jet 35b. The Schmitt triggers 50a and 50b respectively are adjusted to react when the scanning voltage reaches values corresponding to positions $x_2$ and $x_3$ respectively on opposite sides of jet 35b respectively whereby the flip-flop 51 so controls gate 46 that only impulses b may pass therethrough; a similar adjustment is made for the Schmitt triggers 52a, 52b, which react when the beam reaches positions $x_4$ and $x_5$ respectively, on opposite sides of jet 35c with the gate 47 only allowing impulses c to pass therethrough. The gates 45, 46 and 47 are thus successively opened and closed in the required manner whereby all of the impulses a (FIG. 5) may be conveyed to the synchronous detector 41, all of the impulses b may be conveyed to the synchronous detector 42 and all of the impulses c may be conveyed to the synchronous detector 43. The voltages appearing at the outputs 24a, 24b and 24c thus each constitutes a measure of the numerical density of the atoms or molecules contained within the jets 35a, 35b and 35c respectively. These voltages can thus be applied to a measuring and/or recording instrument and/or be used to regulate the heating of the crucibles in the manner described in relation to FIG. 1.

It has been supposed that the jets 35a, 35b and 35c issued from distinct sources and consisted of differing vapors If, however, these jets were to issue from a common source, the outputs 24a, 24b and 24c could be merged, or a single-channel synchronous detector such as detector 21 in FIGS. 1 and 2 could be used, but this detector must then be synchronized at a frequency equal to the product of the scanning frequency times a multiple equal to twice the number of jets. For a given scanning frequency $f_o$, there are thus obtained, both when the outputs 24a, 24b, 24c are merged and when a single-channel synchronous detector is used, impulses of frequency $2nf_o$, $n$ being the number of jets. To be able to obtain in this way a signal of higher frequency may have very real advantages.

Clearly, other electronic detection circuits could be conceived by those skilled in the art, whether the gauge be used for measuring the rate of evaporation from a single crucible or from several crucibles.

Figure 7:
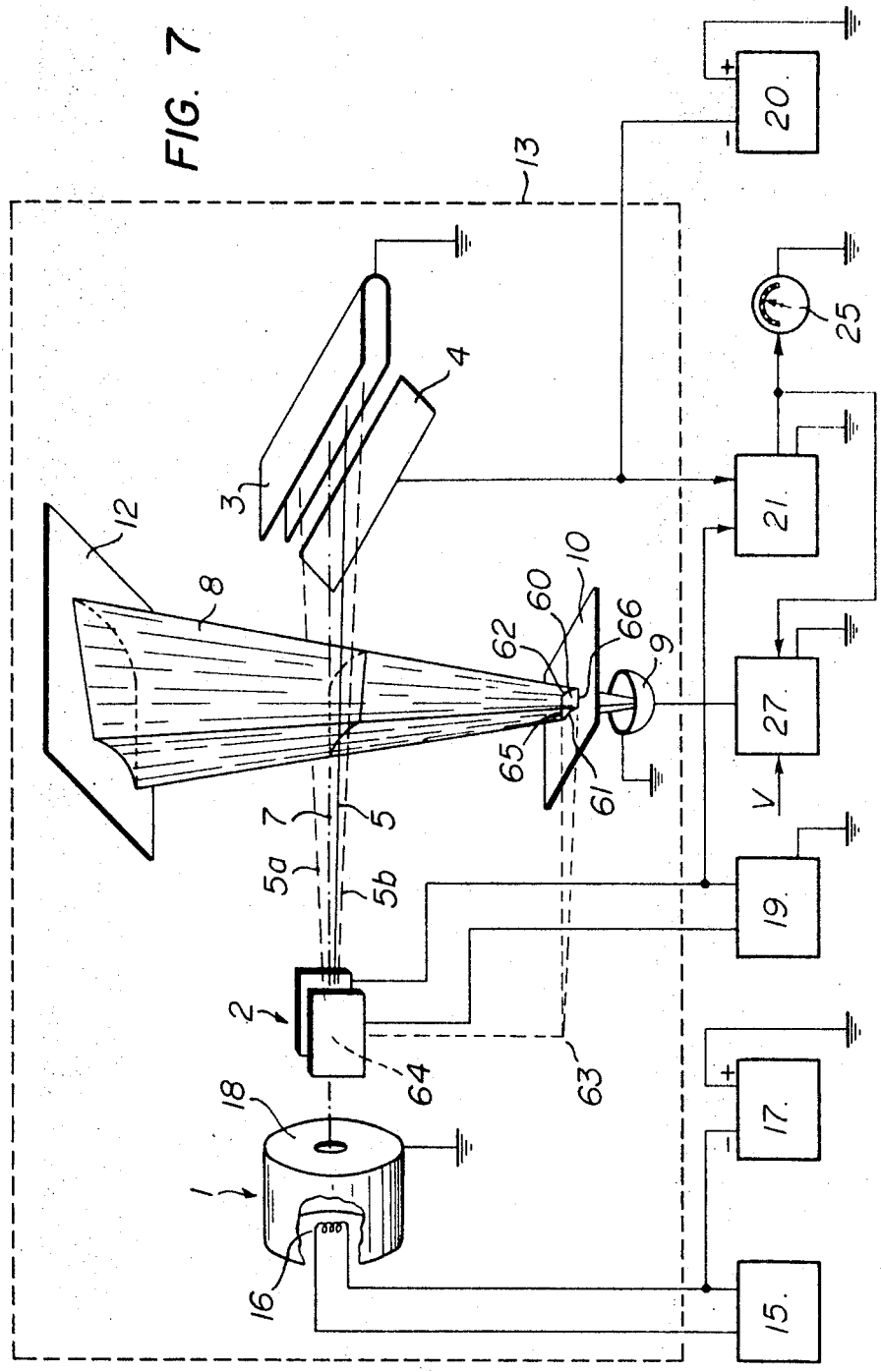
FIG. 7 is a diagrammatic view of a third embodiment of the gauge.

The third embodiment which is shown in FIG. 7 differs as regard the nature of the scanning action to which the electronic beam 5 is subjected and as regards the shape of the diaphragm 10 which defines the cross section of the vapor jet 8. Instead of a saw-toothed scanning action, a square wave scanning action is resorted to here, as is apparent from curve 70 (FIG. 8) formed by the voltage that is applied between the plates of the deflector 2, and the axis of the electron gun 1 is so positioned that the electronic beam 5, in one of its extreme positions, passes by the side of the vapor jet 8 and that, in the other of its extreme positions, passes through this vapor jet. Diaphragm 10 is formed with an opening 60 having the shape of a curvilinear trapezium, the two parallel sides 61 and 62 of this trapezium being formed by concentric arcs centered on point 63, this point being the projection, in the plane of diaphragm 10, of the oscillatory center 64 of the electronic beam 5. The two rectilinear sides 65 and 66 of the trapezium converge towards this projection 63. Consequently, the cross section of jet 8 in the scanning plane (this being the plane in which the electronic beam 5 moves) also has the shape of a curvilinear trapezium having arcurate parallel sides centered on the oscillation center 64 of the electronic beam. Further, the electron collector 3 has here a deep concave shape, thereby reducing the disturbance risks which could result from a secondary emission due to the impact of beam 5. It is moreover of advantage to provide it with the shape of a torus, by curving it in the scanning plane, and it is also of advantage to curve the collision products collector 4 by providing it with a conical shape with its axis at right angles to the scanning plane and passing through the oscillation point 64.

Figure 8:
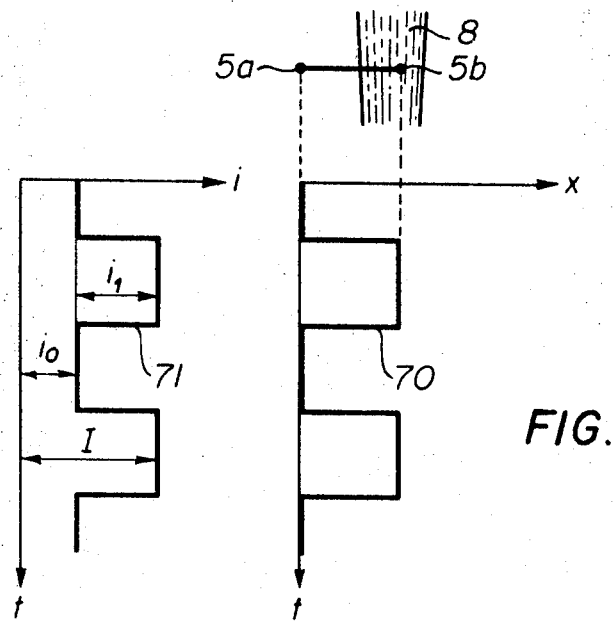
FIG. 8 shows a diagram and two graphs illustrating the operation of this third embodiment.

The operation of this gauge is diagrammatically illustrated by FIG. 8 in which curve 70 represents the variation in time of the scanning voltage which is applied between the plates of deflector 2, in other words the position of the scanning beam 5 in relation to the vapor jet 8. The current $i$ which is collected by the collision products collector 4 has the shape shown by curve 71: this current is formed by a constant current $i_o$, which is due to the collision products generated by the beam 5 when, while in position 5a, it only encounters the atoms of the residual gas, to which is superposed a periodic current $i_1$ which is due to the collision products generated by the beam 5 when, while in position $5_b$, it encounters the jet of vapor. The current which is collected by the collector 4 thus oscillates between the values $i_o$ and $I=i_o+i_1$. The synchronous detector 21, which receives this current, eliminates the continuous component $i_o$, so that the readings on instrument 25 only corresponds to the periodic component $i_1$, the variations in amplitude of this component reproducing the variations in density of the vapor jet, and hence of the variations in the speed of evaporation.

The sweeping action through oscillation and the trapezoidal shape given to the cross section of the jet thus provide this gauge with the treble advantage of being practically unaffected by defects in centering the axis of the electron gun in relation to the vapor jet, as well as by fluctuations in the amplitude of the scanning voltage, and of having a highly constant sensitivity which is independent of bordering effects. These advantages are particularly useful when a speed of evaporation must be measured in a highly accurate and highly reproducible manner.

Clearly, oscillatory scanning will be achieved when the scanning voltage has a rectangular wave shape: the use of square waves, which is a particular case in the use of rectangular waves, simplifies to some extent the circuitry of the scanning generator 19 and of the synchronous detector 21.

Figure 9:
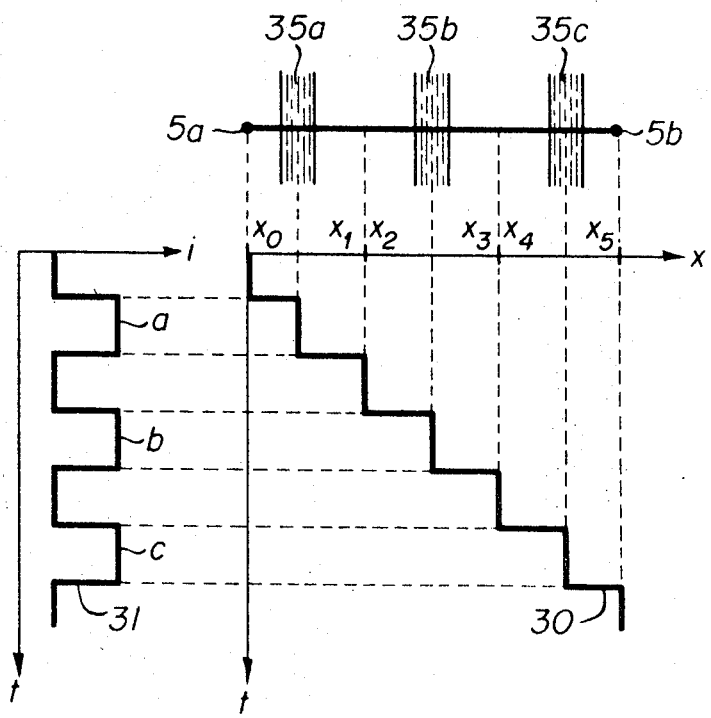
FIG. 9 shows a diagram and two graphs illustrating the operation of this third embodiment in a particular case of use.

Clearly also, when resorting to several parallel jets, use can be made of a stepped scanning action with either a symmetrical or a quick return action, thereby compelling the beam to become stationary successively between and in the jets 35a, 35b and 35c, as shown by curve 30 in FIG. 9 (which should be compared to FIG. 5). Each jet will, in this instance, have a cross section of trapezoidal shape as described earlier in connection with FIGS. 7 and 8.

I claim:

1. A method of measuring, by means of an electronic beam, the rate of evaporation of substances which are vaporized, in the form of at least one jet of vapor in an evacuated enclosure, which comprises generating within said enclosure a sharp electronic beam whose electrons are capable of colliding with the atoms or molecules it encounters, moving the electronic beam in said enclosure to cause it to scan a surface so positioned that said vapor jet may pass therethrough, collecting the collision products generated during scanning, thereby giving rise to a current having a continuous component, due to the collisions with the particles of residual gas present in said enclosure, and a periodic component, due to the collision with the particles of the vapor jet, separating said continuous component from said periodic component, and measuring the amplitude of the latter, which amplitude represents the numerical density of the vapor jet particles.

2. A method according to claim 1, wherein the signal formed by the amplitude of said periodic component is used to control the evaporation of said vapor jet, whereby the rate of evaporation may be tied to a given set value.

3. A method according to claim 1, which comprises using the inelastic collisions of the electrons of said beam, the collision products that are collected being ions which are generated within said vapor jet by said beam, so that said current is an ionic current.

4. A method according to claim 1, which comprises using the elastic collisions of the electrons of said beam, the collision products that are collected being electrons of said beam which are scattered by said vapor jet, so that said current is an electronic current.

5. A method according to claim 1, which comprises imparting to said electronic beam a rectilinear scanning action, said scanned surface being a portion of a plane through which passes said vapor jet.

6. A method according to claim 1, which comprises imparting to said electronic beam a circular scanning action, said scanned surface being a conical revolution surface through which passes said vapor jet.

7. A gauge for measuring, by means of an electronic beam, the rate of evaporation of substances which are vaporized in the form of at least one jet of vapor in an evacuated enclosure, which comprises:
 a. an electron source comprising an electron gun constructed to generate a sharp electronic beam, a deflecting device located at the outlet of said electron gun, and a scanning generator for controlling said deflecting device for moving said sharp electronic beam along a scanning surface having as its axis of symmetry the axis of the electron gun;
 b. an electron collector located, in relation to the vapor jet, on the side opposite the electron source;
 c. a collision products collector placed away from said scanning surface for collecting the collision products generated by said electron beam along its path;
 d. at least one measuring instrument; and
 e. a detection circuit, connecting said collision products collector to said measuring instrument, comprising means for eliminating the continuous component of the current circulating in said collector under the effect of the collected collision products and means for transmitting to said measuring instrument only the periodic component of said current so that said measuring instrument is insensitive to the collision products generated in the residual gas present in said enclosure but sensitive only to the collision products generated in said vapor jet.

8. A gauge according to claim 7; wherein said collision products collector has imparted thereto, in relation to said electron collector, a negative potential, so that the collision products it collects are ions generated by inelastic collisions of the electrons of said electronic beam.

9. A gauge according to claim 7, wherein said collision products collector has imparted thereto, in relation to said electron collector, a positive potential, so that the collision products it collects are electrons scattered through elastic collision of the electrons of said electronic beam.

10. A gauge according to claim 7, wherein said deflecting device has a rectilinear scanning action so that said electronic beam scans a portion of a plane through which passes said vapor jet.

11. A gauge according to claim 7, wherein said deflecting device has a circular scanning action, so that said electronic beam scans a conical revolution surface whose axis meats said vapor jet and through which passes the latter.

12. A gauge according to claim 10, wherein the substances are vaporized in the form of at least two vapor jets and wherein said detection circuit comprises a plurality of different channels, equal in number to that of the jets, and a synchronous electronic switching system for cyclically feeding the current circulating in said collision products collector to each of said channels, said switching system being so controlled by said scanning generator that the succession of channels receiving the current due to the collision products is identical to the succession of vapor jets encountered by said electronic beam, so that said gauge will successively measure the rate of evaporation within several vapor jets.

13. A gauge according to claim 7, wherein said electron collector is connected to a regulator for regulating the current emitted by said electron gun to allow the intensity of said electronic beam to be tied to a constant value.

14. A gauge according to claim 10, wherein the scanning voltage supplied by said generator has a rectangular wave shape so that said sharp electronic beam alternately oscillates in said plane portion from a first position, in which it passes to the side of said jet of vapor to a second position, in which it crosses said jet of vapor, the cross section of the latter in said plane portion having the shape of a curvilinear trapezium having two parallel sides that are concentric arcs centered on the point of oscillation of said electronic beam and two other sides that are radial in relation to these arcs.